Figure 1:
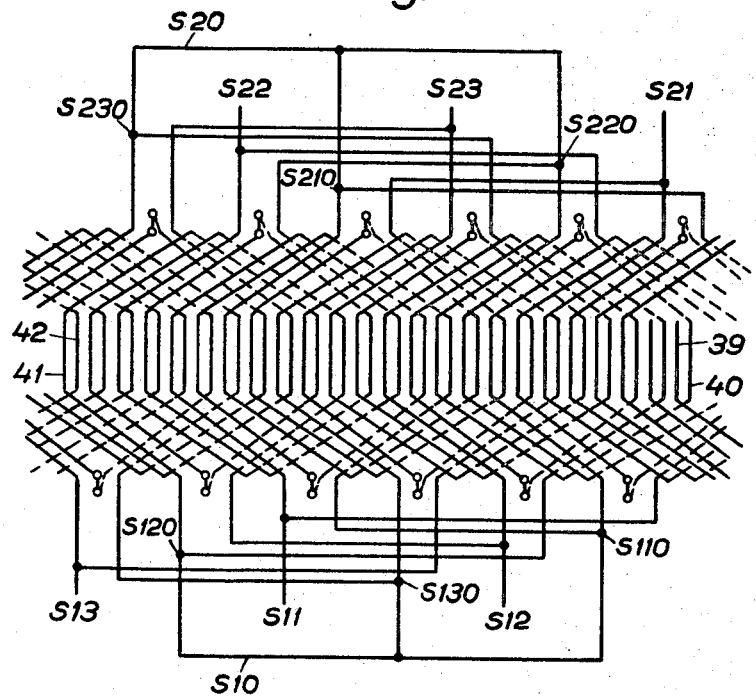

Aug. 6, 1968

DYNAMOELECTRIC MACHINE A.C.-D.C. CONVERTER SYSTEM

Filed Dec. 15, 1965

United States Patent Office 3,396,324
Patented Aug. 6, 1968

3,396,324
DYNAMOELECTRIC MACHINE A.C.-D.C. CONVERTER SYSTEM
Nils Karlsson, Ragnar Lundqvist, Sven Nilsson, and Richard Sivertsen, Vasteras, Sweden, assignors to Allmänna Svenska Elektriska Aktiebolaget, Vasteras, Sweden, a corporation of Sweden
Filed Dec. 15, 1965, Ser. No. 514,048
Claims priority, application Sweden, Dec. 30, 1964, 15,813/64
3 Claims. (Cl. 321—28)

The present invention relates to a D.C. generator system with static commutators, which D.C. generator system comprises a multi-phase A.C. generator and a rectifier system composed of static rectifiers, the system being connected to the armature winding and constituting said static commutators.

In such D.C. generator systems it is usual for the armature winding of the A.C. generator to be made as a symmetrical three phase system, whereas the static commutator is made as a 6-pulse rectifier bridge—which in practice is considered to give the most advantageous solution—or under low power or at other not very demanding conditions, as a 3-pulse bridge.

Particularly in the last mentioned case, but also with 6-pulse bridges, however, considerable harmonics may occur at the D.C. side as well as at the A.C. side. It has been observed that the harmonics on the A.C. side give rise to appreciable additional losses in an A.C. generator which is delivering full power through a 6-pulse rectifier bridge. In particular, the losses in the rotor surface can be very troublesome. Thus, it has turned out that a three phase A.C. generator which is loaded in this way must be made with such large dimensions that the weight at the same power is 10–20% higher than that of a corresponding A.C. generator which is not loaded through a rectifier.

Since the ordinal $n$ for the current harmonics which occur on the A.C. side in a rectifier bridge is generally expressed by the formula $$n = k \cdot p \pm 1$$

where $p$ is the number of pulses and $k$ a whole number, certain harmonics with lower ordinals can be eliminated, and the additional losses of the A.C. generator reduced, by using a 12-pulse bridge instead of a 6-pulse bridge. A 12-pulse bridge is, however, in many respects less advantageous than a 6-pulse bridge, among other things because the conducting interval of each rectifier unit only makes an electrical angle of 60°, whereas the corresponding angle in a 6-pulse bridge is 120°. Because of the small heat capacity in the semi-conductor rectifiers, it is substantially the maximum value of the current which is decisive for the maximum temperature in the semi-conductor element, which means that with a 12-pulse bridge there are twice as many and equally large rectifiers as with a 6-pulse bridge. Further, the short conducting interval is a disadvantage, because it entails frequent and relatively great temperature variations which often expose the semi-conductor crystals of the rectifiers to damaging mechanical stress.

The present application describes an arrangement through which it is possible to obtain a strong reduction of the harmonics in the field curve in the A.C. generator of a rectifier generator system without using a 12-pulse bridge for rectifying and without diverging from the conventional design of the armature winding.

The invention relates to a D.C. generator system comprising an A.C. generator, whose armature winding in a way known per se is divisible into twelve equal winding parts, the voltages of said winding parts being representable by twelve vectors of equal length, evenly distributed over an angle of 360°, and a system of rectifier bridges connected to the A.C. generator and dimensioned for full generator power, said winding parts in a way known per se being connected to form an even number of Y-connected, symmetrical three-phase systems turned 30° in relation to each other, each of said three-phase systems being connected to a 6-pulse rectifier bridge, at least the D.C. sides of the bridges being galvanically separated from each other.

In an embodiment of a D.C. generator system according to the invention said tweleve winding parts are connected to form four three-phase systems turned 30° in relation to each other. In this case each of the four three-phase systems is formed quite simply by conecnting three winding parts, the voltages of which are displaced by 120° in relation to each other, in Y-connection. This arrangement has the disadvantage that the number of electrical connections between the generator and the rectifier system is relatively great, but on the other hand it has the advantage that the complete system can be divided into four parts insulated from earth and from each other, which means there is less risk of short circuits due to insulation faults. According to another embodiment of the invention, the winding parts are connected to form two three-phase systems turned 30° in relation to each other. This arrangement is well known and generally used when parallel or series connection of winding parts in an A.C. armature is to be done. In a conventional three-phase machine with parallel or series connected winding parts, the armature winding is thus made with six equal winding parts, the voltage vectors of which are displaced by 60° in relation to each other. Two winding parts represented by vectors with a mutual angular displacement of 180° are series or parallel connected with each other to form a winding phase in a three-phase system. Even in a system according to the invention the winding parts are series or parallel connected in this way. The only difference is that the generator used according to the invention has twelve winding parts instead of six, which in series or parallel connection give two symmetrical three-phase systems instead of one.

The method of operation of the invention will be described in the following, in the first place only with reference to the embodiment with two three-phase systems. When two symmetrical three-phase windings, which are displaced $\alpha$ radians in relation to each other, are arranged on the same stator in an A.C. generator, whose D.C. magnetised rotor rotates at the electrical angular speed $\omega$, the time displacement between the two systems will be $$t_1 = \alpha/2\pi \cdot T = \frac{\alpha}{\omega} \tag{1}$$

where T is the time of a period at fundamental frequency $f$. A symmetrical three-phase current with frequency $n \cdot f$ gives rise to a rotating sinusoidal M.M.F.-wave in the stator with a length corresponding to the pole pitch and a rotational speed of $n \cdot \omega$. The two three-phase systems are denoted by I and II. The angular distance is denoted by $x$, measured in radians from a certain starting point ($x=0$) to an arbitrary point on the stator surface and $t$ denotes the time in seconds. If the point $x=0$ and $t=0$ is chosen so that the M.M.F. wave for system I goes through zero when $x=0$ and $t=0$, the equation for the rotating M.M.F. wave for system I will be:

$$M_\mathrm{I} = k \cdot \sin\,(n \cdot \omega t \pm x) \tag{2}$$

where $k$ is a constant depending on the type of winding and current strength.

System II is displaced $\alpha$ radians in space and $\alpha/\omega$ seconds in time in relation to system I and is loaded in exactly the same way, so the following equation is obtained:

$$M_{II} = k \cdot \sin\left[n \cdot \omega\left(t \div \frac{\alpha}{\omega}\right) \pm (x - \alpha)\right] =$$
$$k \cdot \sin\left[(n\omega t \pm x) - (n \pm 1)\alpha\right] \quad (3)$$

Where $\pm$ occurs, $+$ is valid for an anti-clockwise rotating wave and $-$ for a clockwise rotating wave.

For $(n \pm 1) \cdot \alpha = c\pi$, where $c$ is an odd number (1, 3, 5, 7, etc.), the following is obtained:

$$M_{II} = k \cdot \sin\left[(n \cdot \omega t \pm x) - c\pi\right]$$
$$= -k(\sin \cdot n\omega t \pm x) = M_I \quad (4)$$

If $c$ is an odd number, the sum of the two systems will thus be zero, which means that the resulting M.M.F. wave in the stator will then be zero, assuming that $$(n \pm 1)\alpha = c\pi \quad \text{or} \quad \alpha = \frac{c}{n \pm 1}\pi \quad (5)$$

$+$ being valid for a counter-clockwise rotating wave and $-$ for a clockwise rotating wave.

From the formula $n = kp \pm 1$ it is evident that a 6-pulse rectifier bridge generates clockwise rotating waves which are harmonics of the order of 7, 13, 19, 25, etc. and counter-clockwise rotating waves which are harmonics of the order of 5, 11, 17, 23, etc. If the two three-phase systems are each connected to a corresponding 6-pulse bridge, the value of $\alpha$ at which a certain harmonic disappears in the field curve of the stator can be found by inserting one of the above mentioned numbers in Equation 5. It has been proved then that clockwise-rotating waves of the numeral 7, 19, etc. and the counter-clockwise rotating waves of the numerals 5, 17, etc. cancel each other out in the armature field at a certain value of $\alpha$, namely $$\alpha = \frac{\pi}{6}$$

which corresponds to a turning of 30 electrical degrees between the two three-phase systems of the armature winding.

If $n = 1$, then $n - 1 = 0$, and from the Equations 2 and 3 it is evident that for the fundamental frequency of the field curve the following will be obtained $$M_I + M_{II} = 2M_{II} = 2M_I$$

In the same way the 11th, 13th, 23rd, 25th harmonics from the two rectifier systems are added together, but these have low amplitudes in comparison with the 5th and 7th harmonics and only cause relatively small additional losses.

It can easily be understood that the same result can be reached with the embodiment of the invention where the twelve parts of the armature winding are connected together to form four three-phase systems. Since in the last mentioned case there are two pairs of three-phase systems and the systems in each pair are turned 30° in relation to each other, the harmonics in the field curve must disappear within each pair in the same way as explained above. Thereby they also disappear from the complete field.

Figure 2:
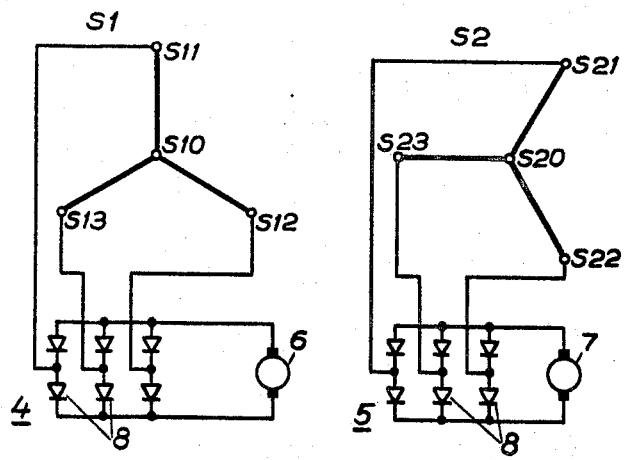
Figure 3:
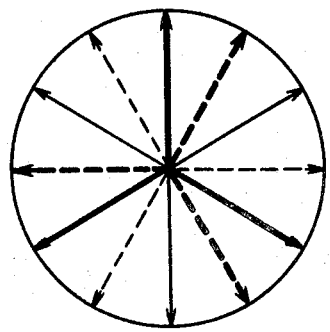
Figure 4:
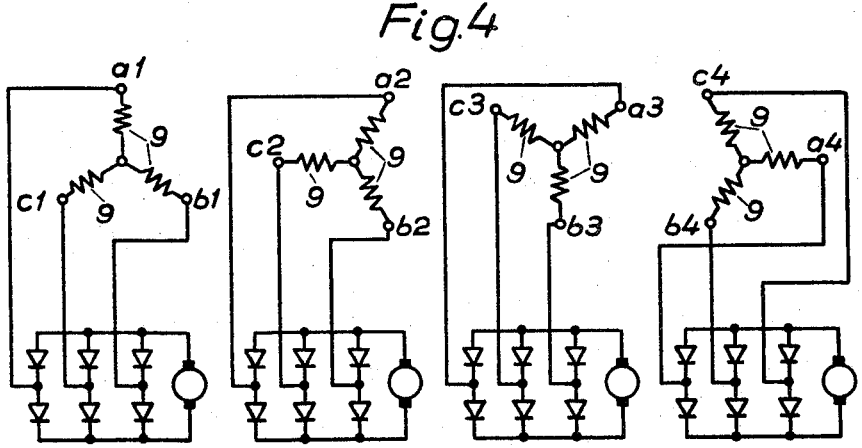
Figure 5:
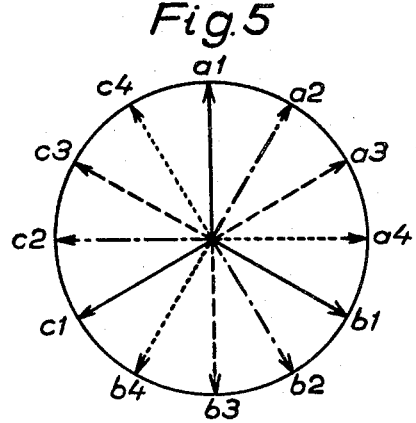

In the following the invention will be described with reference to the accompanying schematic drawings, where FIG. 1 shows the armature winding for a three-phase generator which is part of a D.C. generator system according to the invention. The armature winding comprises twelve equal winding parts, which can be represented by twelve voltage vectors of equal length, distributed evenly over 360°, and which are connected together to form two three-phase systems. FIG. 2 shows the two three-phase systems and their connection to recifier bridges in a D.C. generator system according to the invention, and FIG. 3 shows a diagram for the voltages of the winding parts and the three-phase systems. FIG. 4 shows the connection of the winding parts and the rectifier system in an embodiment of the invention where four three-phase systems are used and FIG. 5 shows the corresponding vector diagram.

The armature winding shown in FIG. 1 is intended for a 2-pole turbogenerator, whose armature is made with 48 slots and with one coil side per slot. The armature winding is made with the coil pitch 19, that is with a shortened pitch. All 48 coil sides are shown on the figure, but because of the space required only the coil sides 39, 40, 41, 42, have been numbered (the designation corresponds to the slot number). The armature winding is provided with 24 output conductors which are drawn outside the winding itself and which constitute the ends of the twelve equal winding parts into which the winding is divided. Each winding part comprises two series connected coils. By connecting the winding parts which are displaced 180° in relation to each other on the armature circumference in parallel in pairs and by Y-connecting those pairs which form 120 electrical degrees with each other, the three-phase systems S1 and S2 shown in FIG. 2 can be obtained and each of the above mentioned pairs thereby constitutes a winding phase. The connection terminals S110, S120, S130 in FIG. 1 are connected to each other at the neutral point denoted by S10 in FIG. 2. In the same way the terminals S210, S220 and S230 correspond to the neutral point S20 in FIG. 2.

In one of the three-phase systems those ends of the Y-connected winding phases which are connected to the neutral point are denoted by S110, S120 and S130, and in the other three-phase system by S210, S220, S230, while the coresponding phase terminals are denoted by S11, S12, S13, and S21, S22, S23 respectively. The ends of the winding phases belonging to one of the three-phase systems are arranged at one end of the stator and those belonging to the other three-phase systems are arranged at the other end of the stator.

The voltage polygon for the coil sides is 48-sided, for the coils 24-sided and for groups of two series connected coils, 12-sided. The twelve voltage vectors in FIG. 3 thus represent the voltages of the twelve winding parts mentioned above. The thick unbroken and broken pointers on the figure represent the two three-phase systems which occur as a result of parallel connection of said winding parts in pairs.

In FIG. 2, the numerals 4 and 5 denote 6-pulse rectifier bridges, which are each connected to a three-phase winding. Each bridge consists of six semi-conductor rectifiers 8. D.C. motors 6 and 7 are each connected to a bridge.

In FIG. 4 the phase terminals for one of the four three-phase systems are denoted by $a1$, $b1$, $c1$, and, for a system turned 30° in relation to it, by $a2$, $b2$, $c2$, a system turned 30° in relation to $a2$, $b2$, $c2$, by $a3$, $b3$, $c3$, and a system turned 30° in relation to the latter by $a4$, $b4$, $c4$. Each of the twelve winding parts which are connected together to form the above mentioned four three-phase systems is denoted by 9. The rectifier bridges are constructed, loaded and conected to their respective three-phase systems in the same way as in FIG. 2.

FIG. 5 shows a voltage vector diagram for the arrangement on FIG. 4.

A D.C. generator system according to the invention is particularly suitable in connection with electrically driven vehicles, for example diesel electric locomotives, since low weight and small space requirements are particularly desirable in such cases. In addition, it should be noted that the division of the load, which is a necessary condition for the invention, does not entail extra complications, since it is often desirable to manufacture the vehicle with several motors, for example one motor for each pair of wheels.

In addition to the D.C. generator system described with reference to the drawing, several different embodiments are feasible within the scope of the invention. Thus an armature winding represented by twelve equally large voltage vectors which are distributed over 360°, can also be constructed in a multi-pole machine, with many different numbers of slots, with one or several coil sides per slot and at many different arrangements of the conductors in each of the twelve winding parts. Further, the rectifier bridges can be made with controlled rectifiers, so that the speed regulation of connected D.C. motors can be produced by varying the control of the rectifier.

We claim:

1. D.C. generator system comprising an A.C. generator, whose armature winding is divisible into twelve equal winding parts, the voltages of said winding parts being representable by twelve vectors of equal length, evenly distributed over an angle of 360°, and a system of rectifier bridges connected to the A.C. generator and dimensioned for full generator power, said winding parts being connected to form an even number of Y-connected, symmetrical three-phase systems turned 30° in relation to each other, 6-pulse rectifier bridges equal in number to the number of three-phase systems, each of said three-phase systems being connected to one of said 6-pulse rectifier bridges, at least the D.C. sides of the bridges being galvanically separated from each other.

2. In a D.C. generator system as claimed in claim 1, said winding parts being connected to form two symmetrical three-phase systems, each phase in the three-phase systems consisting of two of said winding parts connected together.

3. In a D.C. generator system as claimed in claim 1, said winding parts being connected to form four symmetrical three-phase systems.

References Cited

UNITED STATES PATENTS

| | | | |
|---|---|---|---|
| 1,872,253 | 8/1932 | Davis | 321—5 |
| 2,015,745 | 10/1935 | Deri | 321—28 |
| 3,009,091 | 11/1961 | Hallidy | 322—28 |
| 3,290,579 | 12/1966 | Hausner | 321—5 X |

MILTON O. HIRSHFIELD, *Primary Examiner.*

WARREN E. RAY, *Examiner.*